United States Patent [19]
Dahlberg et al.

[11] 3,740,524
[45] June 19, 1973

[54] METHOD FOR CUTTING CURVED PATTERNS IN GLASS SHEETS DISPOSED ON A FLUID AIR SUPPORT

[75] Inventors: John R. Dahlberg, Jeannette, Pa.; Terrence A. Dear, Newark, Del.

[73] Assignee: PPG Industries, Inc., Pittsburgh, Pa.

[22] Filed: Mar. 26, 1971

[21] Appl. No.: 128,385

Related U.S. Application Data

[63] Continuation of Ser. No. 829,075, May 29, 1969, abandoned.

[52] U.S. Cl. ............ 219/121 LM, 65/112, 83/402, 225/96.5
[51] Int. Cl. ............................................. B23k 9/00
[58] Field of Search ............... 219/121 EB, 121 L; 302/31; 225/96.5; 83/402; 33/27 R, 276; 269/20, 57

[56] References Cited
UNITED STATES PATENTS

| | | | |
|---|---|---|---|
| 3,543,979 | 12/1970 | Grove et al. | 219/384 |
| 3,424,357 | 1/1969 | Curtze et al. | 225/96.5 |
| 3,597,578 | 8/1971 | Sullivan et al. | 219/121 L |
| 3,369,101 | 2/1968 | Curcio | 219/121 L |

FOREIGN PATENTS OR APPLICATIONS

| | | | |
|---|---|---|---|
| 1,244,346 | 7/1967 | Germany | 219/121 L |
| 6,607,025 | 11/1966 | Netherlands | 219/121 L |

*Primary Examiner*—R. F. Staubly
*Assistant Examiner*—George A. Montanye
*Attorney*—Chisholm and Spencer

[57] ABSTRACT

A pattern-cutting apparatus for glass comprising an air-support table periodically supplied with compressed air for supporting the glass above the table, a source of thermal energy disposed above and below the glass sheet for inducing a fracture in the glass, and a motor and turning mechanism for turning the glass between the energy sources so as to describe a pattern in the glass sheet when it rotates between the sources and producing a pattern-cut piece of glass when the glass is severed along the fracture line.

8 Claims, 2 Drawing Figures

INVENTORS
JOHN R. DAHLBERG
TERRENCE A. DEAR

METHOD FOR CUTTING CURVED PATTERNS IN GLASS SHEETS DISPOSED ON A FLUID AIR SUPPORT

CROSS REFERENCE TO RELATED APPLICATION

This application is a continuation of our co-pending application Ser. No. 829,075, filed May 29, 1969, and now abandoned.

BACKGROUND OF THE INVENTION

In the processing of glass, it is frequently desirable and necessary to form patterns in the glass which are non-linear and non-rectangular in shape, including circular pieces of glass known as "portholes". The prior-art method of cutting portholes is to use a circular template and to hand-score the pattern to be severed. The operation of scoring and breaking out the pattern from the glass sheet is difficult because of the tendency of the glass to crack and break in irregular patterns.

SUMMARY OF THE INVENTION

This invention relates to a method of cutting a pattern, especially circular plates, from a glass sheet using sources of thermal energy to induce thermal strain in the glass sheet. The glass sheet is supported on an air table and disposed between energy sources. A turntable device rotates the supported sheet between the sources of thermal energy, thereby producing circular or other pattern-cut glass sheets which have very clean and sharp break edges and eliminating the traditional hand scoring using a template.

DESCRIPTION OF THE DRAWINGS

A complete understanding of the invention may be obtained from the foregoing and following description thereof, taken in conjunction with the appended drawings, which are diagrammatic and not to scale unless noted, and in which.

DESCRIPTION OF THE PREFERRED EMBODIMENT

Figure 1:
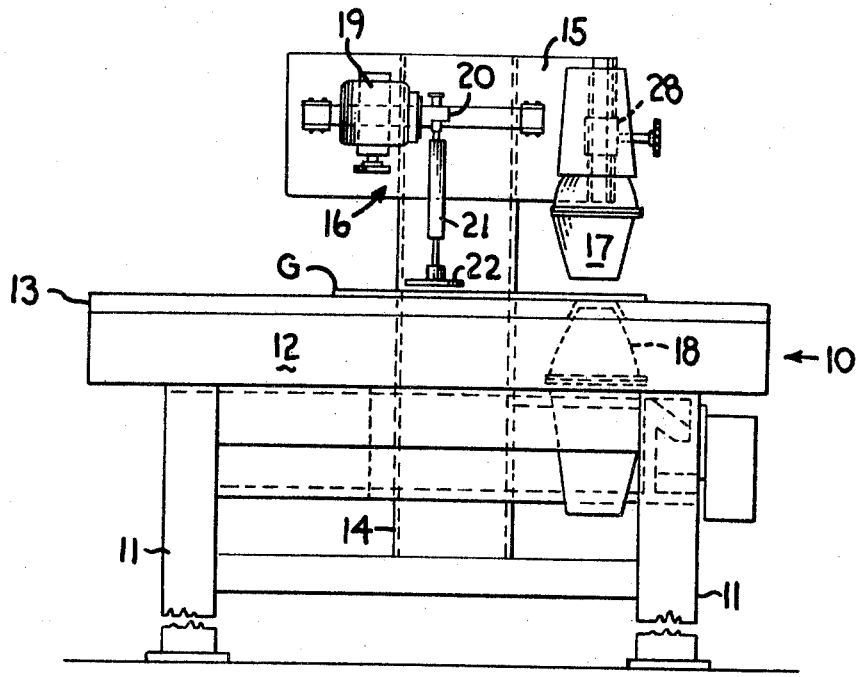
FIG. 1 shows a front view of a cutting apparatus in accordance with the present invention.
Figure 2:
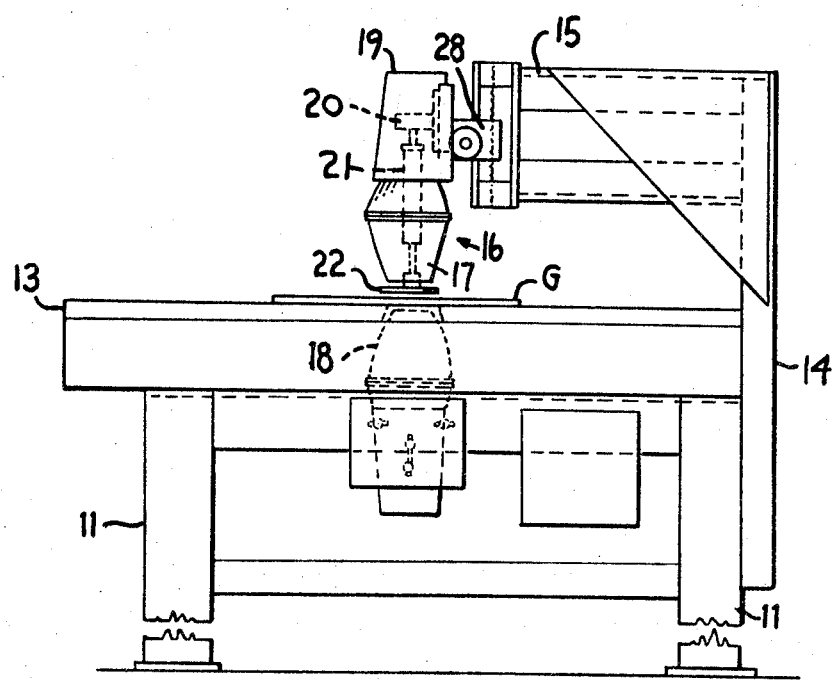
FIG. 2 is a side view of the apparatus illustrated in FIG. 1.

An air-support table 10 having any suitable supporting frame 11 provides a stable support for a glass workpiece G. The table has a plenum section 12 with a surface 13 providing air under pressure when a portion of the surface is covered by the glass workpiece. All of the devices necessary for the rotation and severing of the glass are mounted above the table on vertically extending support member 14. A support member 15 extends in a substantially horizontal position over the center of the table. The support member 15 is used as a base for mounting for a thermal-energy source 17 and a turntable assembly 16 above glass workpiece G. A rack-and-pinion mechanism 28 provides means for moving the thermal-energy source 17 relative to the surface of the glass G. An additional thermal-energy source 18 is usually located in a relatively fixed position below the glass surface because there is no mechanical need for additional clearance between the source and the glass. The turntable assembly 16 has a motor 19, a driving mechanism 20, and a spindle 21. Glass-contacting plate 22 rotates with spindle 21.

Sources of electrical energy (not shown) are connected to the thermal-energy sources 17 and 18. A typical source of thermal energy used for the induction of thermal stresses is described in U. S. application Ser. No. 708,952, filed Feb. 28, 1968, now abandoned, and commonly assigned. Many sources of thermal energy are contemplated for use with this invention. Among those contemplated are a Quartz-Line heater, lasers, or sources of thermal energy such as a mixture of carbonaceous fuel and air.

OPERATION

The table top is usually an air-support surface with a plenum beneath. The plenum is supplied with air at a pressure sufficient to float a sheet of glass upon the table. The gap between the surface of the plenum and the bottom of the glass is maintained at one-sixteenth inch or less by use of a suitable pressure regulator and the air supply (not illustrated). Glass to be cut is then moved into position on the support table. Glass can then be easily rotated by the turntable assembly 16. The rotational speed and direction are adjusted by a speed control (which is not shown herein). In a preferred embodiment, the heat sources are spot heaters operated at 120 volts and 6.3 amperes. After a 2-second warm-up, the glass is rotated at approximately one revolution per minute. As the glass turns into the last half of the cutting quadrant, the rotational speed is reduced to one-half of a revolution per minute, which permits the induction of more thermal energy into the cutting path. The actual energy focal point of each spot heater is located 0.16 inch from the glass with a tolerance of ± 0.06 inch. Tests have shown that for the best circle production, an overage of at least 3 inches of glass around the intended circle produces the best operation. It has been further found that using a square piece of glass that has first been cut into a hexagonal shape further improves the quality of the cut.

The best thermal cutting must originate at a flaw. It is therefore recommended that a hand score be run from an edge of the glass to the intended cut line, to help induce a fracture in the glass.

ALTERNATE EMBODIMENTS

A spot heater having a high heat-flux density, that is, a spot heater with a high wattage, provides the best source of thermal energy for running the fractures.

The apparatus of this invention permits the severing of pattern shapes from a sheet of glass; it provides cut sheets which are very accurately sized and eliminates the necessity for hand scoring, using a template. The edge of a piece of glass severed in accordance with the present invention is smooth and uniform when compared with edges severed by a hand-score operation.

We claim as our invention:

1. A method for cutting glass comprising:
   providing a piece of glass,
   providing a fluid support to vertically support said piece of glass solely on said fluid support, said piece of glass having opposed major surfaces which are in a generally horizontal position when said piece of glass is so supported,
   disposing a means for cutting said piece of glass in vertically spaced relation to said fluid support,
   engaging said piece of glass with contact means, and
   moving said piece of glass with said contact means past said means for cutting said piece of glass while said piece of glass is vertically supported solely on said fluid support so that said piece of glass is cut along a predetermined path of cut by said means for cutting said piece of glass.

2. The method of claim 1 which comprises providing said fluid support by applying air under pressure from a plenum section to one of said major surfaces of said piece of glass.

3. The method of claim 2 which comprises engaging the other of said major surfaces of said piece of glass with said contact means.

4. The method of claim 3 which comprises moving said piece of glass with said contact means along a curvilinear path of cut.

5. The method of claim 3 which comprises cutting said piece of glass by the application thereto of thermal energy.

6. The method of claim 5 which comprises applying said thermal energy from a thermal source spaced from said piece of glass and concentrating said thermal energy on said path of cut.

7. The method of claim 4 which comprises cutting said piece of glass by the application thereto of thermal energy.

8. The method of claim 7 which comprises applying said thermal energy from a thermal source spaced from said piece of glass and concentrating said thermal energy on said path of cut.

* * * * *